US005661979A

United States Patent [19]
DeBoer

[11] Patent Number: 5,661,979
[45] Date of Patent: Sep. 2, 1997

[54] SELF-CONTAINED REFRIGERATION DEVICE FOR FRUIT

[76] Inventor: Ed DeBoer, 2891 Buena Crest Ct., San Jose, Calif. 95121

[21] Appl. No.: 629,429

[22] Filed: Apr. 8, 1996

[51] Int. Cl.$^6$ ................................................. F25B 21/02
[52] U.S. Cl. ..................... 62/3.6; 62/457.9; 62/407
[58] Field of Search ...................... 62/457.1, 457.2, 62/457.7, 457.9, 371, 372, 440, 407, 404, 419, 3.6, 3.2, 3.7

[56] References Cited

U.S. PATENT DOCUMENTS

| 3,040,539 | 6/1962 | Gaugler | 62/3.6 |
| 4,014,178 | 3/1977 | Kells | 62/3.6 |
| 4,845,958 | 7/1989 | Senda et al. | 62/78 |
| 5,315,830 | 5/1994 | Doke et al. | 62/3.6 |

*Primary Examiner*—John M. Sollecito
*Attorney, Agent, or Firm*—The Kline Law Firm

[57] ABSTRACT

A self-contained storage and display unit intended to be used for fruit. Cooling of the device is accomplished by the use of commercially available thermoelectric cooling (TEC) chips. A heat sink is included to dissipate the heat generated by the TEC chips. The rate of fresh air flow through the storage area can be controlled by the user to speed or slow the ripening rate of the fruit.

5 Claims, 7 Drawing Sheets

SELF-CONTAINED REFRIGERATION DEVICE FOR FRUIT

FIELD OF THE INVENTION

The present invention relates generally to refrigeration devices, and more particularly is a self-contained unit for refrigerated storage, display, and ripening of fruit.

BACKGROUND OF THE INVENTION

The importance of fresh fruit and vegetables to a person's diet has become more and more recognized in the recent past. Health experts, including the American Cancer Society, recommend that an individual consume at least five servings of fruits and vegetables per day. However, surveys indicate that less than 20% of Americans satisfy those guidelines.

One problem consumers face in partaking of sufficient fruit is that fruit is fairly difficult to store and display. The best place to store fruit is in a refrigerator, but fruit stored in the main area of a refrigerator is usually chilled more than is preferable. Accordingly, most fruit is stored in a produce drawer in the refrigerator. This still allows the possibility of too cold fruit, while creating a much greater probability that the fruit will be forgotten and become spoiled.

To avoid the problem of rotten fruit in a refrigerator drawer, many people choose to store and display their fruit in an open bowl. The bowl allows easy access to the fruit, but, since there is no refrigerated environment, it also shortens the storage life of the fruit.

There is no device in the current art that provides for both refrigeration and display. While there are many devices in the prior art relative to refrigerated storage, none of these devices makes a provision for viewing the contents of the storage device.

Further, the current art refrigeration devices require external power supplies, greatly reducing their mobility and flexibility of use.

OBJECTS, SUMMARY, AND ADVANTAGES OF THE INVENTION

Accordingly, it is an object of the present invention to provide a means to store fruit in a refrigerated environment.

It is a further object of the present invention to allow the fruit stored in the device to be seen without opening the device.

It is a still further object of the present invention to provide a means of controlling the temperature at which the fruit is stored.

It is another object of the present invention to provide a means of controlling the ripening rate of the stored fruit.

In summary, the present invention is a self-contained storage and display unit intended to be used for fruit. Cooling of the device is accomplished by the use of commercially available thermoelectric cooling (TEC) chips. A heat sink is included to dissipate the heat generated by the TEC chips. The rate of fresh air flow through the storage area can be controlled by the user to speed or slow the ripening rate of the fruit.

An advantage of the present invention is that its design allows the unit to be small enough to be stored on a user's counter top.

A further advantage of the present invention is that it requires no external power source, and is therefore completely portable.

Another advantage of the present invention is that the storage temperature and ripening rate of the fruit can be controlled by the user.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
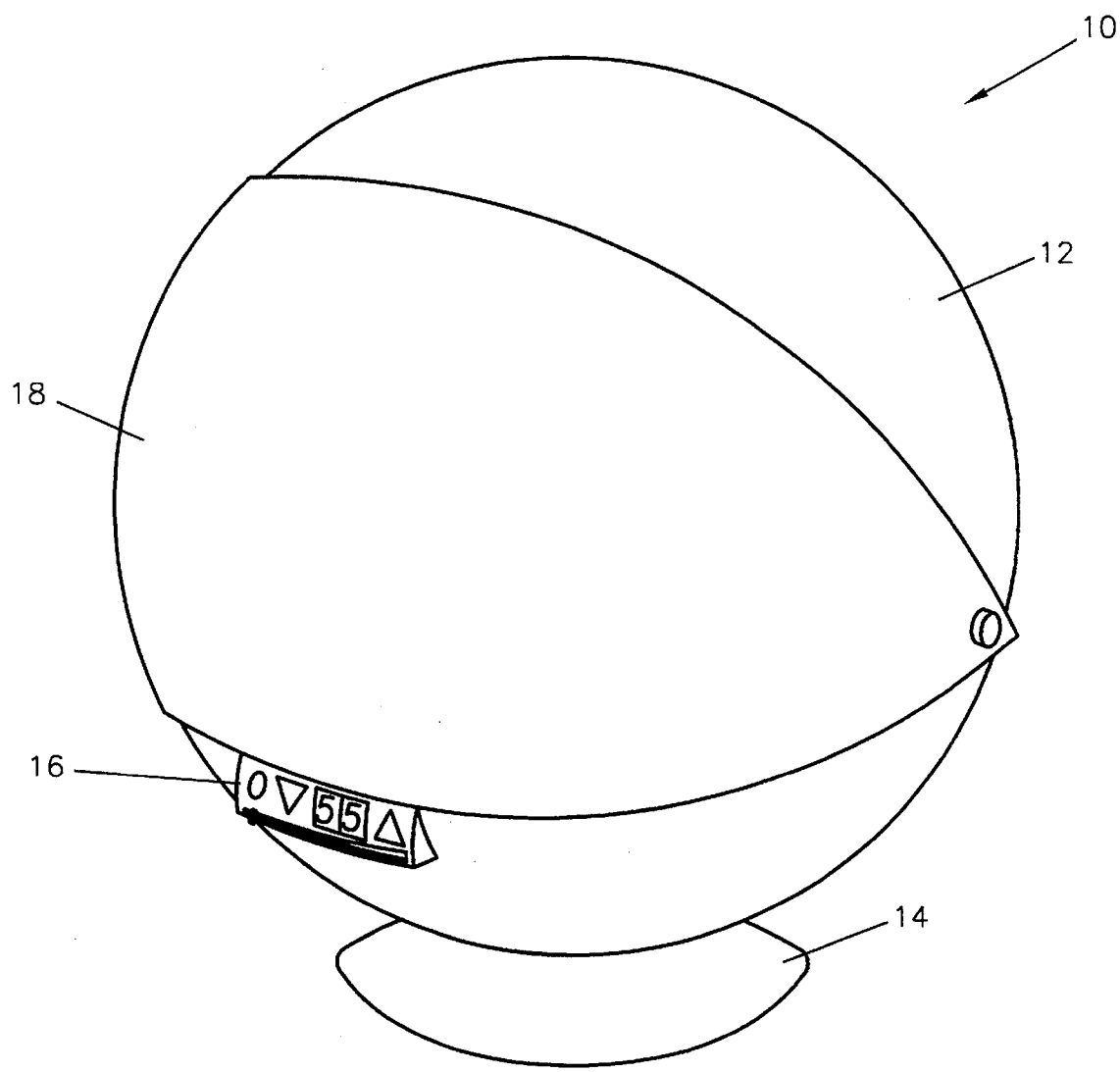
FIG. 1 is a perspective view of the refrigeration/display unit of the present invention.
Figure 2:
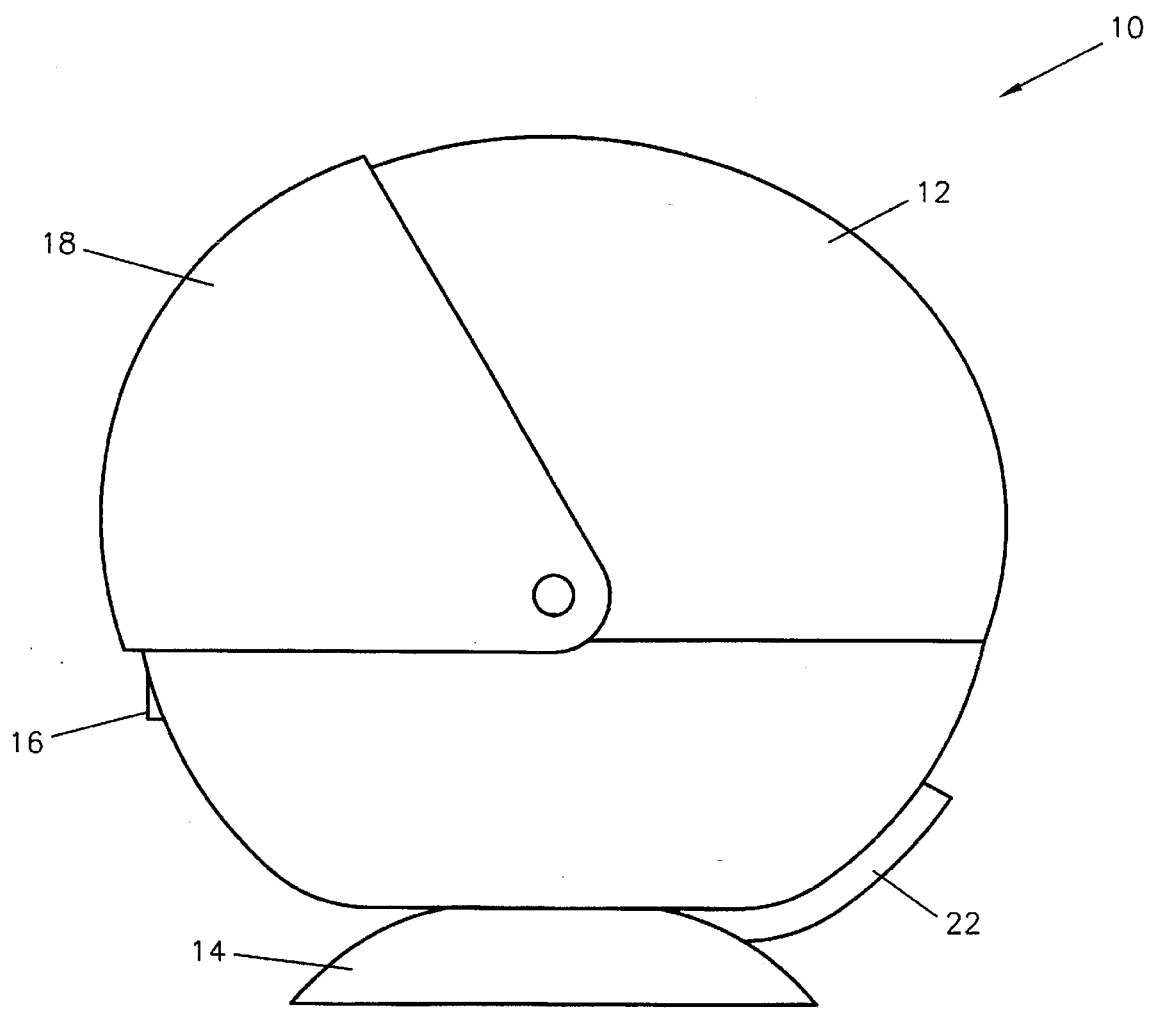
FIG. 2 is a side view of the device.
Figure 3:
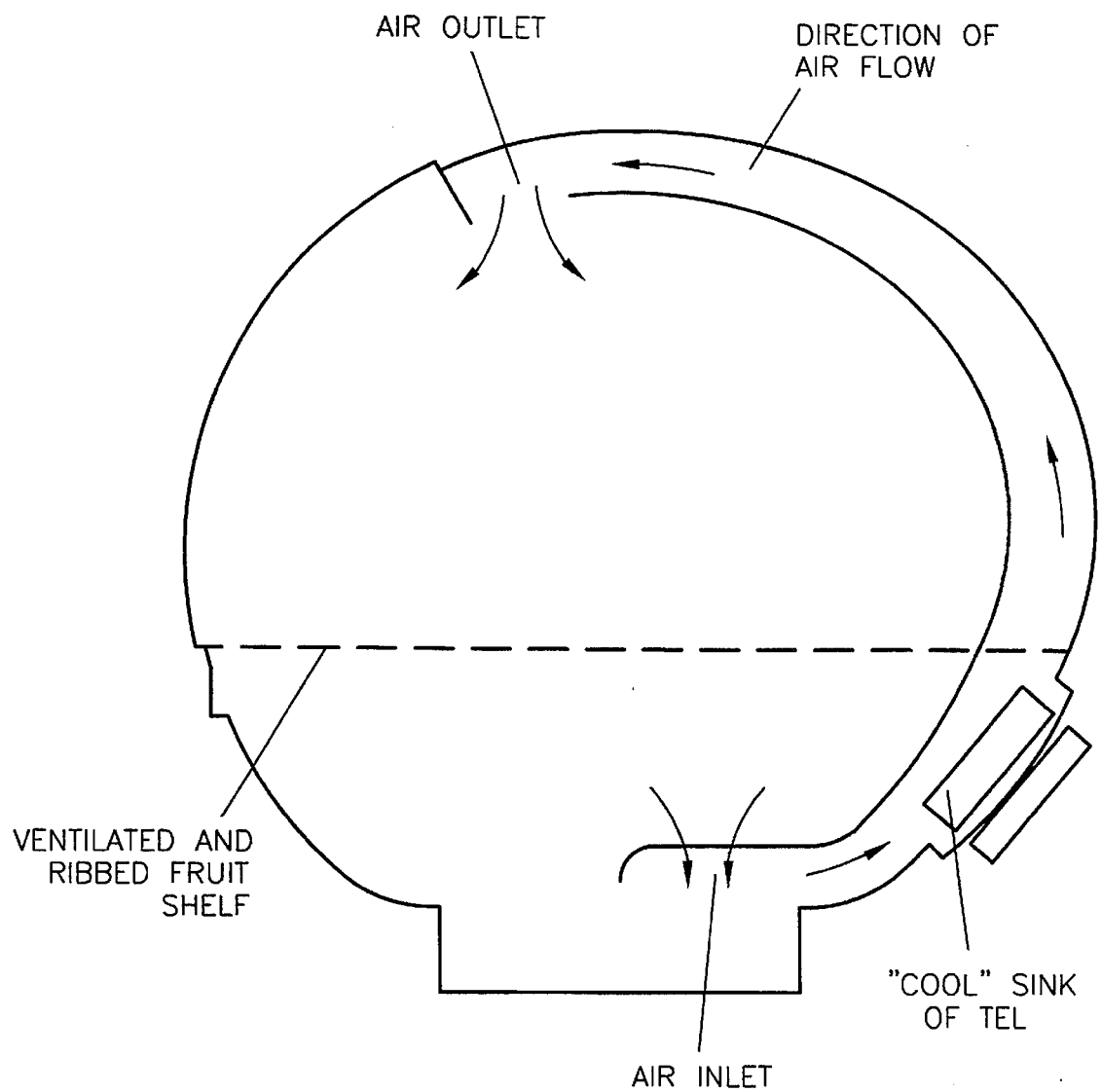
FIG. 3 is a cross sectional view of the present invention.

The present invention is a refrigeration/display unit 10 intended to be used for the storage and display of fruit. The refrigeration/display unit 10 includes an exterior shell 12 mounted on a base 14. A control module 16 is mounted on a front surface of the shell 12 beneath an access door 18. The access door 18 is formed from a dual pane clear acrylic material for visibility and insulation, and is pivotally mounted on the shell 12. Rubber gaskets 181 ensure a tight seal between the door 18 and the shell 12.

Figure 4:
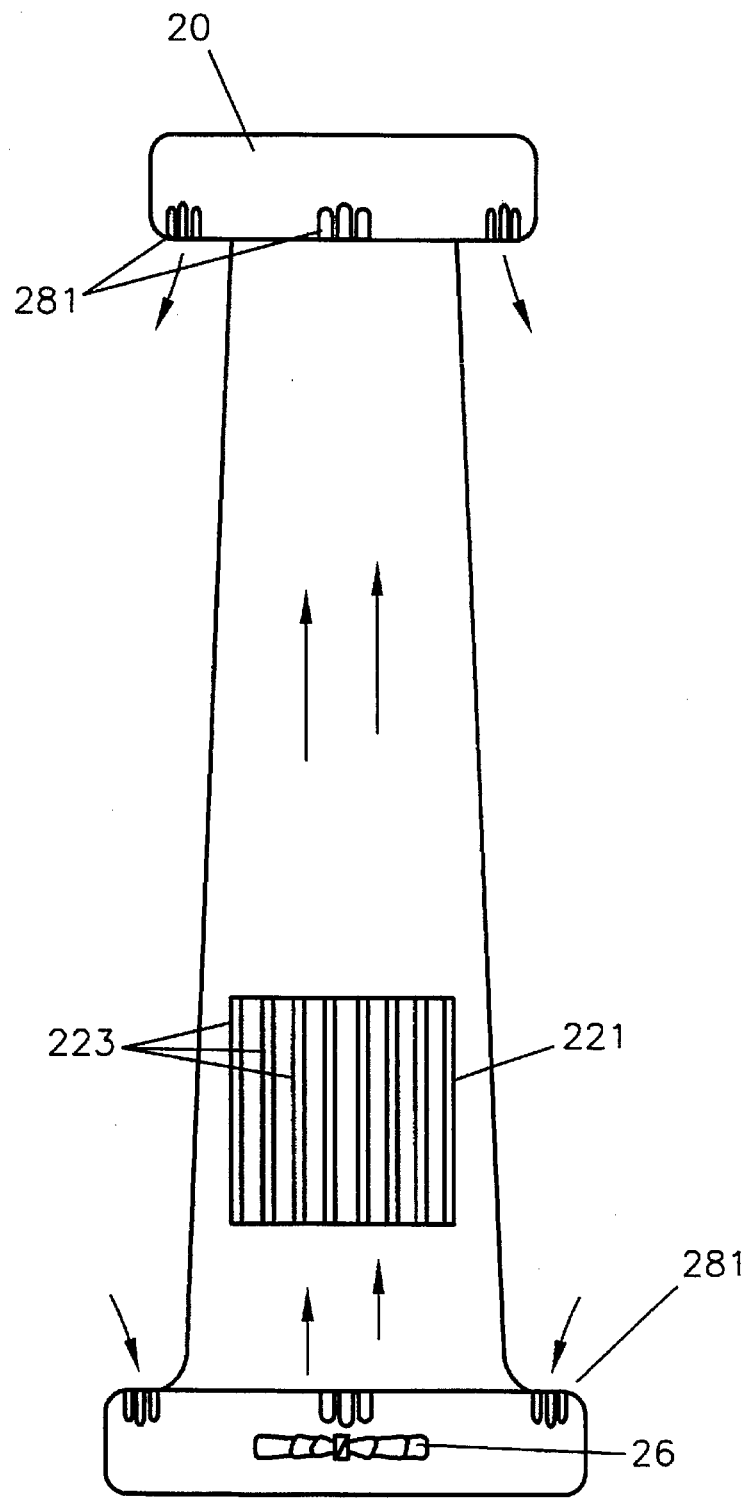
FIG. 4 is a detail view of the venting means.

The shell 12 includes a vent tower 20. The vent tower 20, shown in detail in FIG. 4, houses a cooling means 22 for the device. The cooling means 22 will generally be a thermoelectric cooling (TEC) chip. The TEC chip 22 is affixed between a first, cool sink 221 and a second, heat sink 222. Each of the sinks 221, 222 includes a plurality of fins 223 to maximize the cooling and heating surfaces respectively. The TEC chip 22 is situated so that the cool sink 221 is in the interior of the device, while the heat sink 222 is on the exterior. A power source provides the electric power to the TEC chip 22. So that the unit 10 can be completely self-contained, it is envisioned that the power source may be a battery pack.

A double-headed fan 26 facilitates air flow through an airway 28 in the shell 12. While a first head 261 of the fan draws air upward through the airway 28, across the cool sink 221 where it is cooled, and out through vents 281 into the interior of the refrigeration unit 10. Meanwhile, a second head 262 of the fan 26 pushes air downward across the heat sink 222, and then outward through a vent 281, where it is expelled to the exterior.

Figure 6:
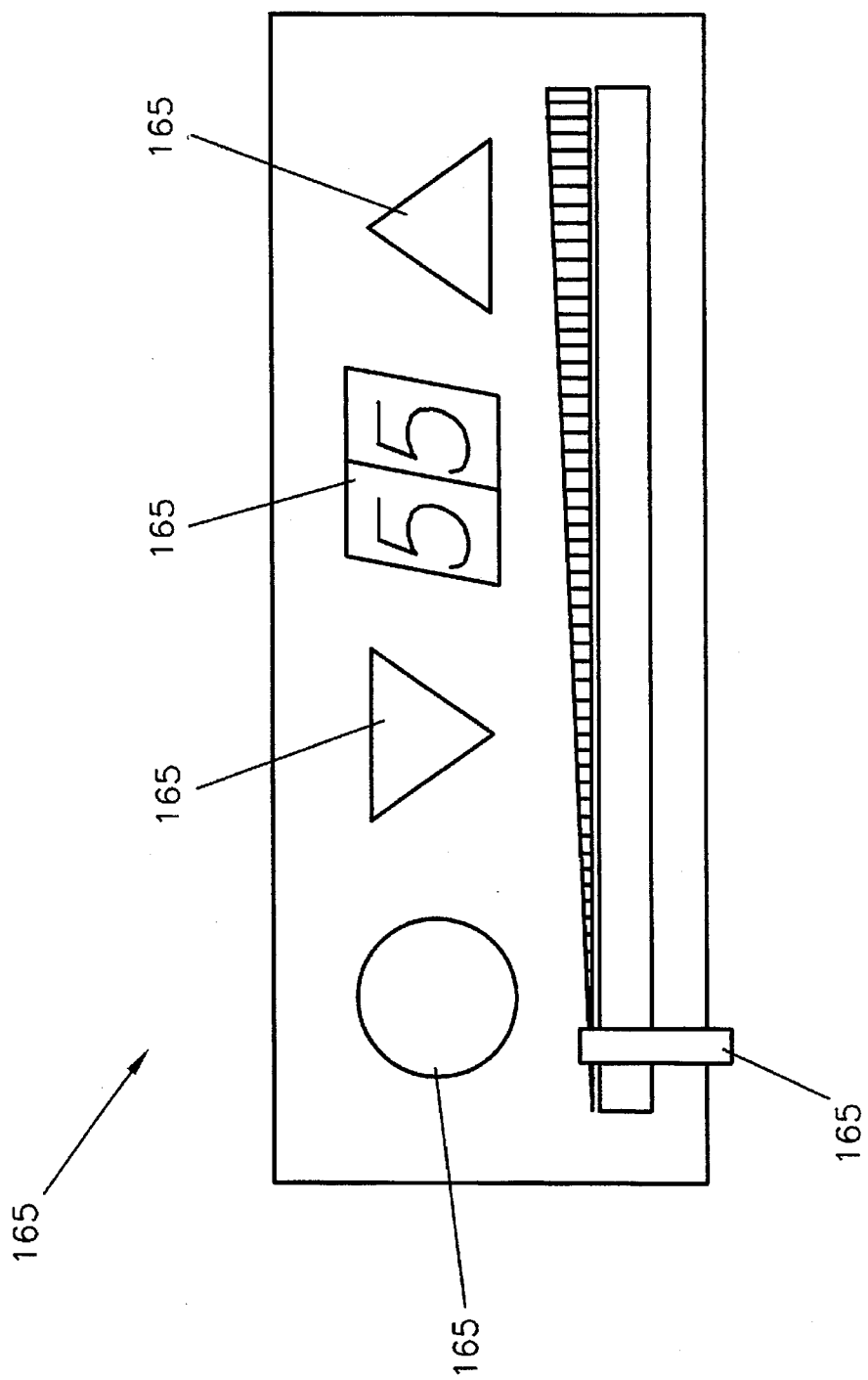
FIG. 6 is a detail view of the control module.
Figure 5:
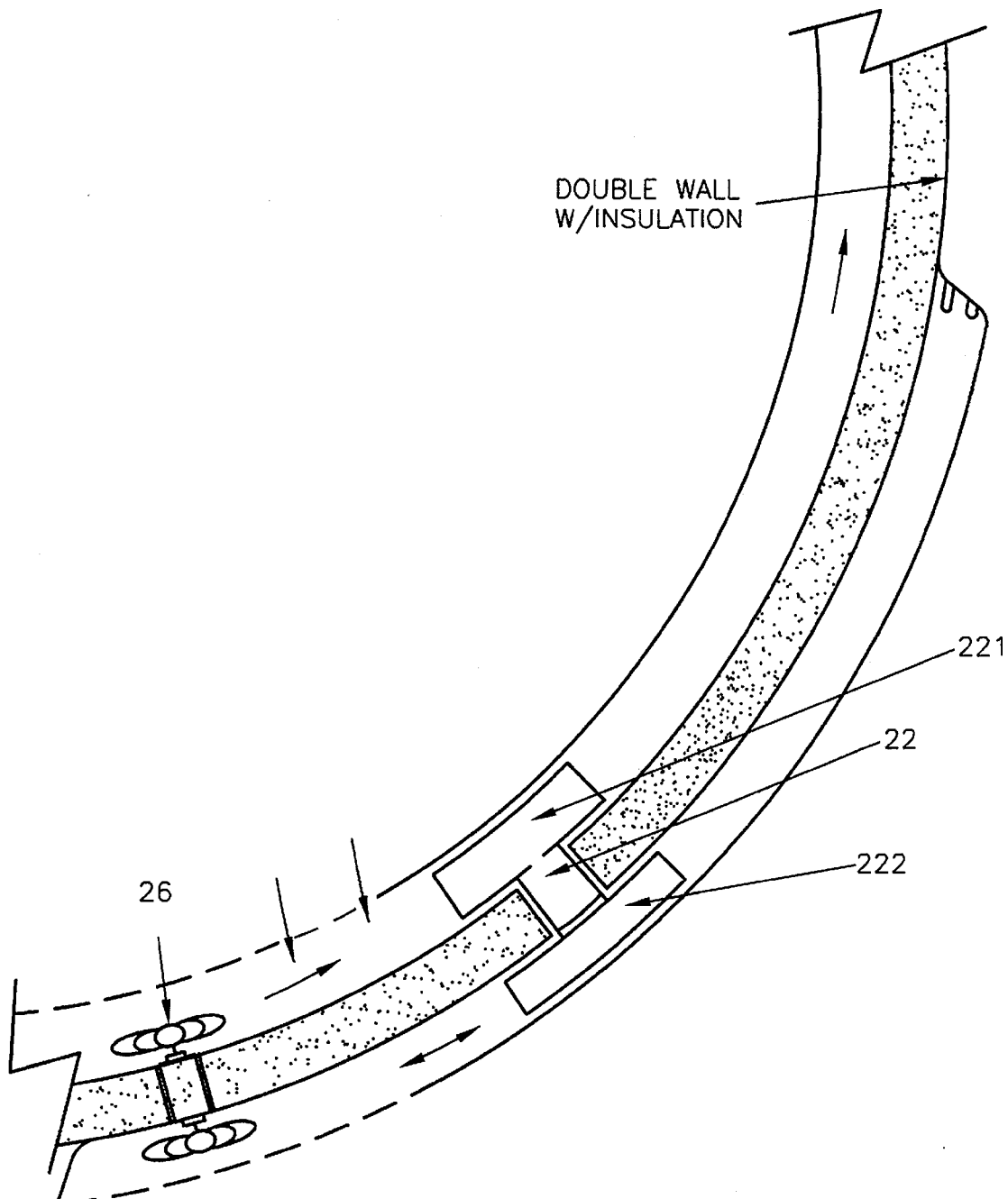
FIG. 5 is a cross section of the cooling means of the refrigeration/display unit.
Figure 7:
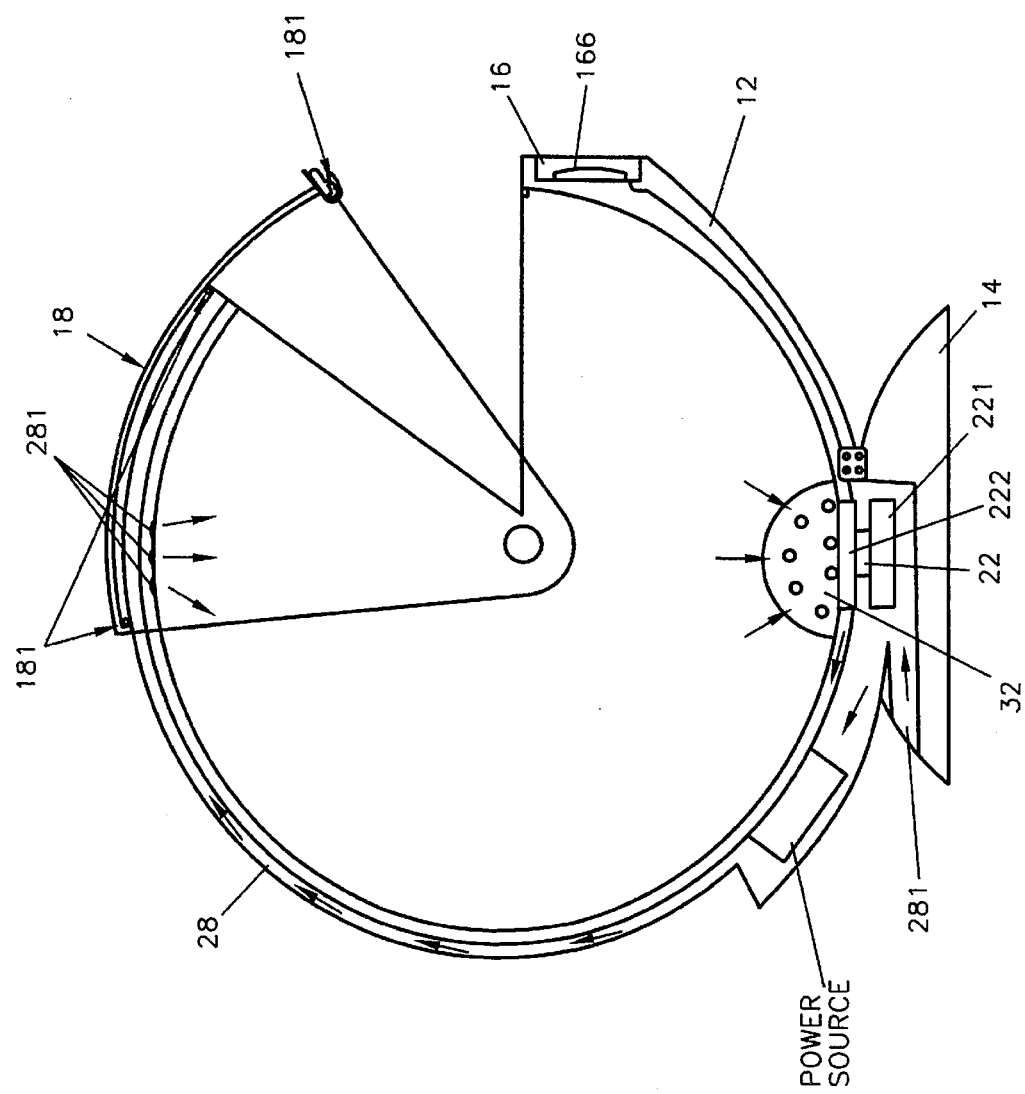
FIG. 7 is a cross sectional view of the refrigeration/display unit.

Operation of the device is controlled by the control module 16, as shown in detail in FIG. 6. The control module 16 includes an on/off switch 161, a control 162 to decrease the temperature in the interior of the device, a control 163 to increase the temperature, a digital readout of the interior temperature 164, and an airflow control 165 to increase and decrease the amount of airflow. A PCB 166 controls the amount of power supplied to the TEC chip 22 and the operation of the fan 26. Circuitry to control these functions is well known in the art, and is therefore not described in detail here.

A user operates the device as follows: Power is supplied to the TEC chip 22 by activating the on/off switch 161. The user monitors the current temperature of the unit on the display 164, and may choose to either increase or decrease the temperature. The user may also choose to either increase or decrease the amount of airflow with the airflow control 165.

The user puts fruit into the interior of the unit 10 by raising the access door 18 and placing the fruit onto a shelf 30. The shelf 30 is removable if the user chooses to have greater storage volume.

If cooling is required, power is supplied to the TEC chip 22, which causes a first surface of the TEC chip, in communication with the cool sink 221, to cool. A second surface of the TEC chip, in communication with the heat sink 222, gets warmer.

Air driven by the fan 26 flows across the fins 223 of the sinks 221, 222. The cooled air that flows across the cool sink 221 is pushed through the airway 28 through vents 281 and into the interior of the unit to reduce the temperature. Similarly, warmed air that flows across the heat sink 222 is expelled through vents 281 to the exterior.

If the user so desires, containers with a desiccant in them can be placed in the interior of the unit. The desiccants absorb the ethylene given off by the ripening fruit, thereby further reducing the chances of spoilage.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A refrigeration unit device comprising:

a substantially spherical exterior shell mounted on a base, a removable shelf, a control module mounted on an exterior of said shell, a clear access door pivotally mounted on said shell, said access door is a segment of a sphere such that the effective volume of said device is not increased when said access door is opened, a vent tower, a cooling means, and a power source; wherein air is urged across said cooling means and into an airway, said airway is contained within said exterior shell and said airway extends for a distance of at least half of a circumference of said shell, said airway includes vents to allow air to flow into said airway from an interior of said device and vents to allow air to flow out of said airway into said interior of said device, thereby reducing the temperature of said interior of said device.

2. The device of claim 1 wherein:

said cooling means is a TEC chip with a first cooling side in communication with a cool sink, said cool sink including a plurality of fins to increase the surface area of said cool sink, a second side of said TEC chip is in communication with a heat sink, said heat sink including a plurality of fins to increase the surface area of said heat sink.

3. The device of claim 1 wherein:

said vent tower includes a fan to aid air flow.

4. The device of claim 3 wherein:

said fan is a two-headed fan, a first head of said fan urges cooled air from said cool sink into said interior of said device, a second head of said fan urges warmed air from said heat sink out of said device.

5. The device of claim 1 wherein:

desiccants are provided to absorb ethylene.

* * * * *